, 
United States Patent
Tabata et al.

(10) Patent No.: US 7,561,222 B2
(45) Date of Patent: Jul. 14, 2009

(54) LIQUID CRYSTAL DISPLAY DEVICE AND MANUFACTURING METHOD THEREOF

(75) Inventors: Shigeru Tabata, Ishikawa (JP); Hideyuki Imura, Ishikawa (JP); Nobuo Kitagishi, Ishikawa (JP); Hiroshi Ootaguro, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 259 days.

(21) Appl. No.: 11/298,588

(22) Filed: Dec. 12, 2005

(65) Prior Publication Data
US 2006/0146264 A1 Jul. 6, 2006

(30) Foreign Application Priority Data
Dec. 20, 2004 (JP) ............................. 2004-367367

(51) Int. Cl.
*G02F 1/1343* (2006.01)
(52) U.S. Cl. ...................................... 349/55
(58) Field of Classification Search ................ 349/55
See application file for complete search history.

(56) References Cited

U.S. PATENT DOCUMENTS 5,086,347 A * 2/1992 Ukai et al. ................. 349/55
5,995,178 A * 11/1999 Fujikawa et al. ............ 349/55
6,436,602 B1 * 8/2002 Imahara et al. ............ 430/199
6,809,332 B2 * 10/2004 Imahara et al. ............ 257/798
6,958,802 B2 * 10/2005 Watamura .................. 349/192
7,224,415 B2 * 5/2007 Yi et al. ..................... 349/54
7,276,385 B1 * 10/2007 MacKenzie et al. ......... 438/4
2006/0012728 A1 * 1/2006 Watamura .................. 349/43

FOREIGN PATENT DOCUMENTS

| JP | 2002-031811 | 1/2002 |
| JP | 2002-182246 | 6/2002 |
| JP | 2002-196344 | 7/2002 |

OTHER PUBLICATIONS

U.S. Appl. No. 11/298,588, filed Dec. 12, 2005, Tabata et al.
U.S. Appl. No. 11/298,889, filed Dec. 12, 2005, Tabata et al.

* cited by examiner

*Primary Examiner*—James A Dudek
(74) *Attorney, Agent, or Firm*—Oblon, Spivak, McClelland, Maier & Neustadt, P.C.

(57) ABSTRACT

A method to manufacture a liquid crystal display device including the steps of: forming contact holes 400, 401 in signal line-broken end portions 1020, 1021 of a signal line 102 in question with respect to a broken portion 20 lying in the signal line 102 in the condition where a center portion of each contact hole is made to deviate from a center portion of the signal line 102 in the direction of the width thereof; filling the contact holes with tungsten; and forming a tungsten line 50 to cover the tungsten-filled contact holes 500, 501 and the broken portion 20.

5 Claims, 5 Drawing Sheets

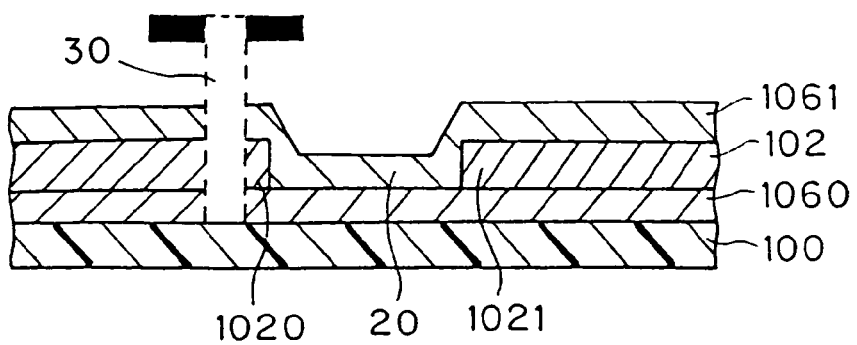
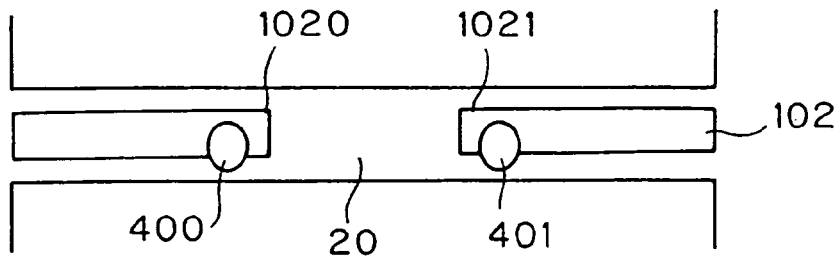
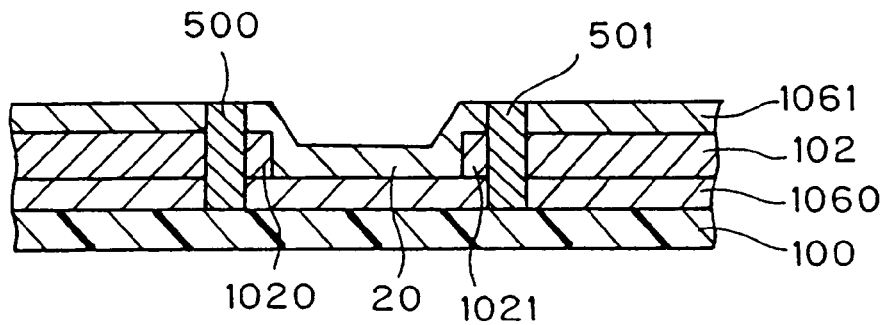
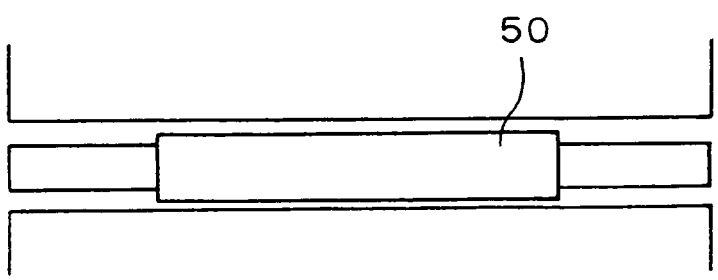
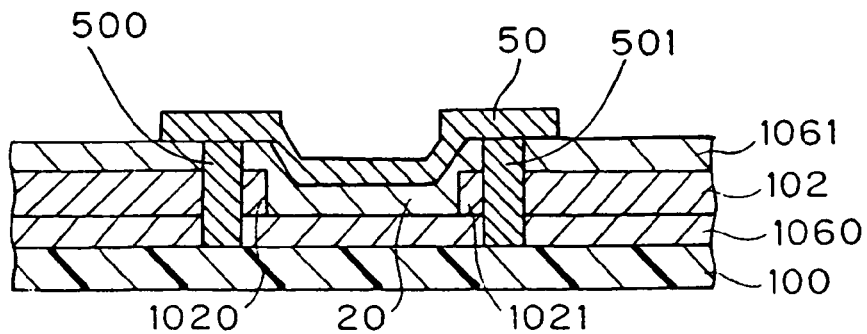

LIQUID CRYSTAL DISPLAY DEVICE AND MANUFACTURING METHOD THEREOF

CROSS-REFERENCE TO RELATED APPLICATIONS

This application is based upon and claims the benefit of priority from the prior Japanese Patent Application No. 2004-367367, filed on Dec. 20, 2004; the entire contents of which are incorporated herein by reference.

TECHNICAL FIELD

The present invention relates to a liquid crystal display device and a manufacturing method thereof. More specifically, it relates to a liquid crystal display device and its manufacturing method including mending (i.e. so-called "repairing") a wiring defect.

BACKGROUND OF THE INVENTION

For the case where a defect is detected in one of signal lines that an array board with an array formed on its substrate has on one primary face thereof, two method are cited in e.g. JP-A-2002-182246.

As the first method is cited a method including the steps of: using a laser beam-shielding slit of a laser machine to form two contact holes, each having an upper face opening and spatial openings formed on both the side of a wiring pattern in the direction of the width thereof up to a depth at which the openings reaches a surface of the substrate, in which the upper face opening and the spatial openings are linked to each other; filling inside the contact holes with a laser CVD film made of an organometallic compound by the laser CVD method; and further connecting the contact holes to each other by the laser CVD film, connecting the contact holes to the same pixel electrode by laser CVD, or connecting the contact holes to different pixel electrodes respectively and then connecting the pixel electrodes to each other by a laser CVD film.

In addition, as the second method is cited a method including the steps of: forming a laser CVD film to cover two end portions of a broken portion from right above the end portions without providing any contact holes; and providing a laser welding portion in each of the end portions of the broken portion.

However, with the first method, a pixel electrode connected with the signal line is brought to a potential different from that of a normal pixel electrode and as such, which produces the possibility that the pixel electrode connected with the signal line is observed as a point defect. Further, with the second method, an insufficient connection area between the signal line and the metal compound formed by laser CVD increases the resistance and as such, the repair ends in failure.

The invention aims at offering a liquid crystal display device reduced in the number of process steps for its production and subjected to repair with low resistance and its manufacturing method.

BRIEF SUMMARY OF THE INVENTION

According to an embodiment of the invention, a liquid crystal display device includes: a pair of boards; a liquid crystal material held between the pair of boards; one of the boards having at least two conductor lines on a primary face thereof; at least one of the at least two conductor lines having a broken portion, and a recessed portion in each of two end portions of the conductor line in question, which the broken portion is located between; the recessed portion made to open at least in a condition where one side of the conductor line in question in a direction of width thereof is left as it is, thereby to exposing a portion of the conductor line along a periphery of the recessed portion; an electrical conducting material placed inside the recessed portion and in contact with the exposed conductor line; and a conductive bridge member to cover the broken portion and an upper end of the electrical conducting material in each of the recessed portions, which the broken portion is located between.

According to an embodiment of the invention, a method to manufacture a liquid crystal display device including a pair of boards and a liquid crystal material held between the pair of boards, includes the steps of: forming a conductor line on a primary face of one of the pair of boards; detecting a broken portion of the conductor line; forming a recessed portion in a portion of each of end portions, which the broken portion detected at the step of detecting a broken portion is located between; filling an electrical conducting material into the formed, recessed portion; and forming a conductive bridge member to continuously cover the broken portion and an upper end of the electrical conducting material located in each of the recessed portions, which are provided so that the broken portion is located therebetween, wherein the forming a recessed portion includes removing a portion of the conductor line so that a portion of the conductor line is left in a direction of a width of the conductor line, thereby forming the recessed portion.

The invention can offer a liquid crystal display device reduced in the number of process steps for its production, in which a broken wire is reliably connected by repair with low resistance, and its manufacturing method.

BRIEF DESCRIPTION OF THE DRAWINGS

FIGS. 2A-2E are sectional and plane views of assistance in explaining steps of a mending method of a first embodiment of the invention.

DETAILED DESCRIPTION OF THE INVENTION

First Embodiment

The first embodiment of the invention will be described below with reference to the drawings.

Figure 1:
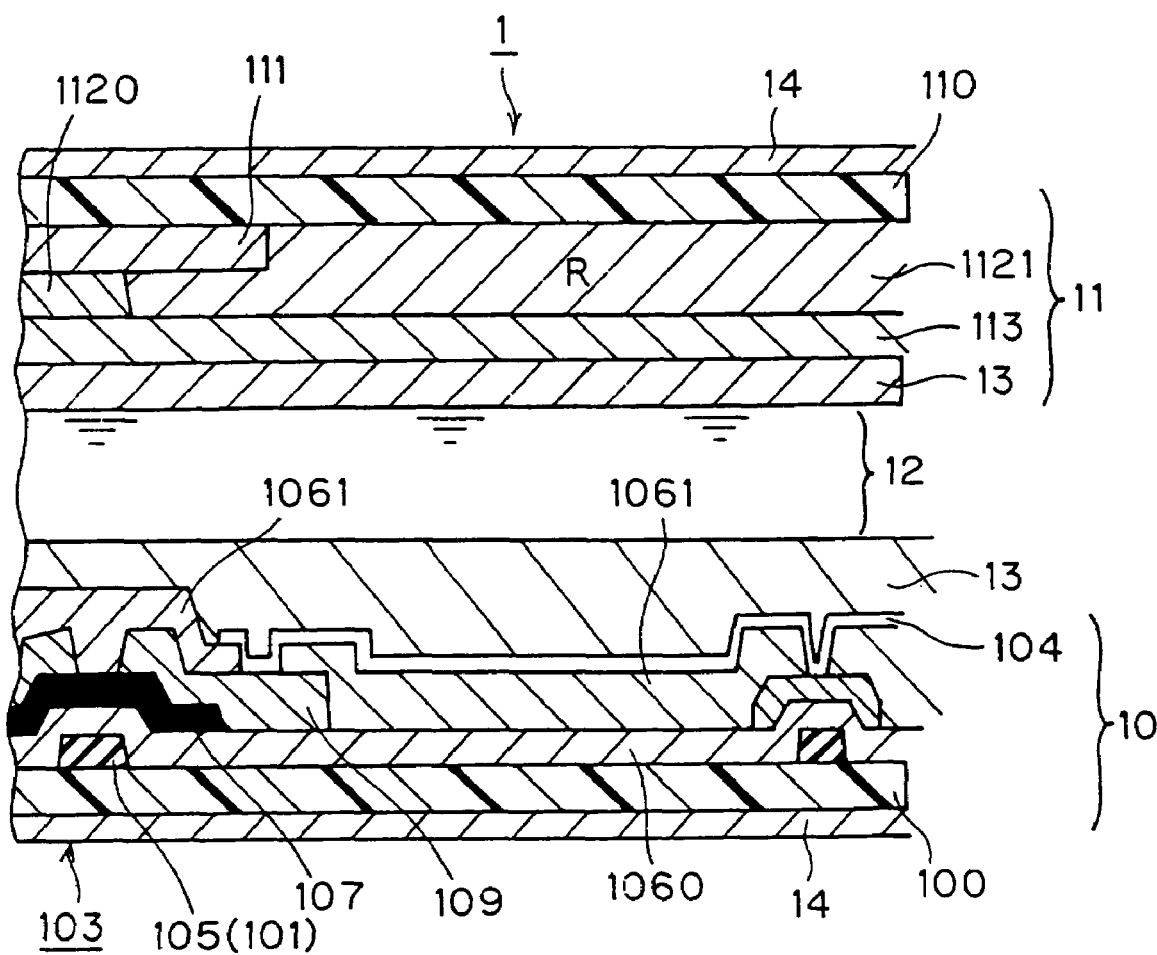
FIG. 1 is a schematic sectional view of a transmission-type liquid crystal display device produced according to the invention.

FIG. 1 is a schematic sectional view of a part of a transmission-type liquid crystal display device according to the embodiment, which is intended for the explanation on the configuration of the liquid crystal display device.

(1) Configuration of Liquid Crystal Display Device 1

The configuration of the liquid crystal display device 1 will be described.

The liquid crystal display device 1 includes: an array board 10; an opposite board 11 placed opposite to the array board 10; a liquid crystal layer 12 held between the array board 10 and the opposite board 11; alignment layers 13 formed on the array board 10 and the opposite board 11 respectively, which determine the orientation of the liquid crystal layer 12; and polarizing plates 14 respectively disposed on faces of the boards on the side reverse to faces in contact with the liquid crystal layer 12. Further, the array board 10 and the opposite board 11 hold bead spacers (not shown) therebetween to make the gap between the boards uniform.

Here, the spacers have the form of a bead, and they are exemplarily shown as ones of the type which are used in a dispersed condition. However, the spacers may be post spacers formed in a post-like shape.

The array board 10 has: a glass substrate 100; a plurality of scanning lines 101 formed on a primary surface of the glass substrate 100; a plurality of signal lines 102 placed substantially orthogonally to the scanning lines; thin film transistors (TFT) 103, each placed in the vicinity of an intersecting point of the scanning and signal lines; and a pixel electrode 104 connected to each thin film transistor 103.

The thin film transistor 103 is made up of: agate electrode 105 connected to the scanning line 101; an isolation film 1060 covering the gate electrode; an amorphous silicon layer 107 as a semiconductor layer lying on the isolation film; a source electrode 108 connected to the signal line 102, which lies on the amorphous silicon layer; and a drain electrode 109.

While an amorphous silicon layer is used as the semiconductor layer of the thin film transistor 103 here, polycrystalline silicon may be used instead. Further, while the structure of the thin film transistor is described here as a bottom gate structure here, it may be a top gate structure.

The opposite board 11 includes: a glass substrate 110; a cancellate black matrix 111 placed on a primary face of the glass substrate 110; three color filters 1120, 1121 and 1122 of red (R), green (G) and blue (B), placed corresponding to regions partitioned by the black matrix 111; and an opposite electrode 113 as a transparent electrode placed and formed on the color filters, which is made of ITO (Indium Tin Oxide).

(2) Method to Produce Array Board 10

The array board 10 is produced as described below.

First, an aluminum film is grown all over a primary face of a glass substrate to form a metal film. Then, the resulting film is patterned to form scanning lines 101, followed by forming a silicon nitride film thereon over all the resulting surface of the substrate to form an isolation film 1060.

Next, an amorphous silicon is formed all over the resulting surface and patterned to form a semiconductor layer.

Subsequently, an aluminum film is formed all over the resulting surface to form a metal film. Then, the metal film is patterned to form a drain electrode 109, a source electrode 108 and a signal line 102.

Next, a silicon nitride film is formed all over the substrate to form an isolation film 1061 to form a contact hole for connection of the pixel electrode 104 with the drain electrode 109.

At the end, an ITO film is formed all over the substrate to form a pixel electrode layer, followed by patterning the pixel electrode layer to form a pixel electrode 104. Thus, the array board 10 is completed.

(3) Method to Modify Defect on Array Board 10

The array board 10 is subjected to a break inspection of the signal lines 102 using an array tester after an array has been formed on the board. When a broken portion 20 is detected during the break inspection of the signal lines 102, the end portions 1020 and 1021 of the signal line 102 in question, which the broken portion 20 is located between, are irradiated with a laser beam 30 respectively.

FIGS. 2A-2E are views showing steps of the method to mend a defect (REPAIR) of the first embodiment.

Specifically, FIG. 2A is a sectional view of a vicinity of the broken portion 20 that the signal line 102 has in the array board 10.

At the beginning, a slit position of a laser irradiation machine is aligned with the laser irradiation targets in the signal line-broken end portions 1020, 1021, and then a laser beam 30 is applied to the laser irradiation targets respectively. As the laser beam 30 is used UV light.

FIG. 2B is a plane view of a location which the laser beam 30 has been applied to.

The laser beam 30 has a diameter of 4 μm. However, the laser beam 30 is not applied to the signal line 102 in the condition where the beam impinges on just the signal line's width, 4 μm, but applied in the condition where the beam is made to deviate by 1-2 μm from one end of each signal line-broken end portion 1020, 1021 in a direction of the width of the signal line, whereby contact holes 400, 401 are formed in the signal line-broken end portions 1020, 1021. In other words, the contact holes 400 401 are formed so that a center portion of a circle making the two-dimensional shape of the contact holes deviates from a center portion of the signal line 102 in the direction of the width thereof.

The laser beam 30 is applied to the signal line 102 in the condition where the laser beam is made to deviate from the end of the signal line 102 in the direction of the width thereof by a length not more than 2 μm representing a radius of the laser beam 30, whereby a lateral area, with which each of the contact holes 400, 401 contacts with the corresponding one of the signal line-broken end portions 1020, 1021 in a direction of the thickness of the signal line 102, becomes the maximum. In other words, the contact holes 400, 401 are bored at least in the condition where one side of the signal line 102 in the direction of the width thereof is left as it is, whereby a portion of the signal line 102 is exposed along the periphery of each of the contact holes 400, 401 in the direction of the thickness of the signal line 102. More specifically, the area S, with which each of the contact holes 400, 401 overlaps with the signal line in the direction of the thickness of the signal line 102, can be expressed as follows, $$S=2\pi rt-2r((\pi/2)-\arcsin(1-a/r))t,$$

where r is a radius of each contact hole 400, 401, and t is a thickness of the signal line 102. The maximum value of the area S in this case is 1-2 μm when the width of the signal line is 4 μm.

The contact holes 400, 401 thus formed are filled by laser CVD under an atmosphere of tungsten to form tungsten-filled contact holes 500, 501.

FIG. 2C shows a cross section of a portion in the vicinity of the contact holes 500, 501 filled with tungsten, which is an electrical conducting material. By doing so, tungsten is placed inside the contact holes 400, 401, and electrically contact with a portion of the signal line 102 exposed along the periphery of each of the contact holes 400, 401.

Next, a tungsten line 50, which is a bridge member, is formed in the shape of a length of line so as to cover all of the tungsten-filled contact holes 500, 501, and the broken portion 20.

FIGS. 2D, 2E are a plane view and a sectional view, which show the portion in the vicinity of the broken portion 20 after the formation of the tungsten line 50.

When hardening of the tungsten line 50 is insufficient, UV light 60 is additionally applied to it to completely harden the tungsten line. Then, repair of the broken portion 20 of the signal line 102 on the array board 10 is completed.

(4) Effect of Embodiment

As shown in the mending method according to the first embodiment, in the case where a signal line 102 has a broken portion 20, contact holes 400, 401 are formed in the signal line end portions 1020, 1021 respectively so that the radial width of each contact hole not just coincides with the overall width of the signal line 102, but deviates a bit from the width of the signal line. Therefore, the lateral area of each contact hole 400, 401 in a location where the contact hole overlaps the signal line 102 makes an area of the signal line 102 in the direction of the thickness thereof. Thus, the contact area of each of the tungsten-filled contact holes 500, 501, with which the contact hole contacts with the signal line 102, becomes larger, and the resistance is made smaller. On this account, better repair can be achieved.

In addition, the contact holes 400, 401 do not completely separate the signal line end portions 1020, 1021 in the middle thereof. Therefore, the first embodiment has the following merit: there is no apprehension that insufficient connection between an exposed portion of the signal line formed by each contact hole and a conductive film formed by the laser CVD causes a break.

Figure 5:
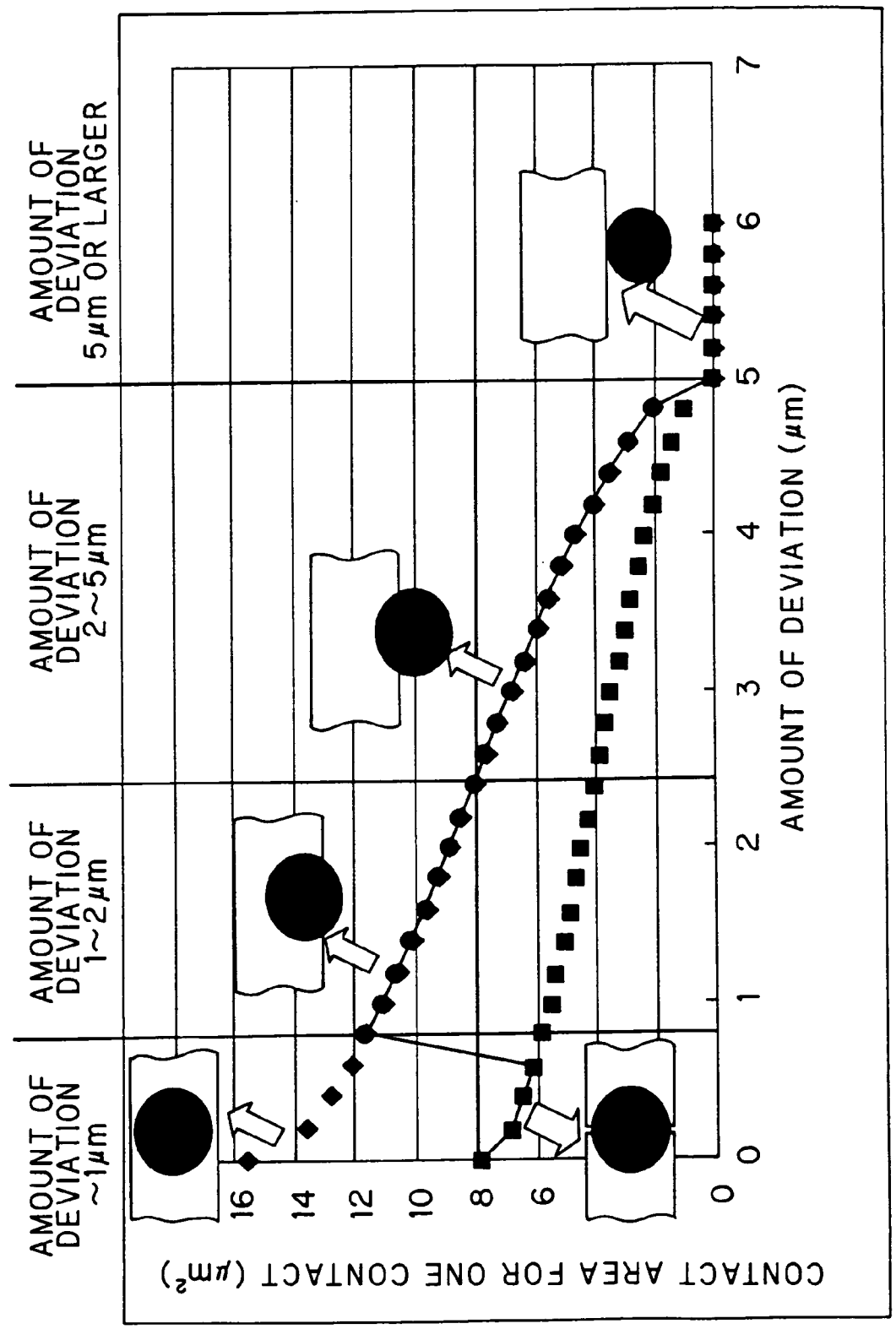
FIG. 5 is a graph showing the relation between an amount of deviation and a contact area.

FIG. 5 is a graph showing the relation between an amount of deviation and a contact area for the purpose of demonstrating the description presented above, in which the horizontal axis represents an amount of deviation and the vertical axis presents a contact area.

In the graph, a diamond mark shows a case where contact holes 400, 401 are provided so as not to separate the signal line end portions 1020, 1021; a square mark shows a result in the case where the contact holes 400, 401 separate the signal line end portions 1020, 1021 completely. Incidentally, the width of the signal line end portions 1020, 1021 is 5 μm.

As shown in FIG. 5, when the amount of deviation falls in a range of 1 to 2 μm, the contact area is large and the contact holes never separate the signal line end portions 1020, 1021 unlike a case shown by a square mark. Therefore, the resistance is made lower and better repair can be achieved.

In addition, when the amount of deviation falls in a range of 1 to 2 μm, the variation in the contact area is small, and therefore the variation in the resistance is also small. For example, when the amount of deviation is zero, the signal line end portions 1020, 1021 are separated or not separated according to the time and circumstances and as such, the resistance varies. When the amount of deviation is 2 μm or more, the variation in the resistance is lower. However, there are some cases where the contact holes are provided out of the signal line end portions 1020, 1021 and as such, the resistance is made higher. Therefore, when the width of the signal line end portions 1020, 1021 is 5 μm, an amount of deviation of 1-2 μm is the most suitable.

Second Embodiment

While the first embodiment shows an example in which the contact holes 400, 401 are formed in the signal line-broken end portions 1020, 1021 respectively, two or more contact holes may be formed in each broken end portion.

FIGS. 3A-3E are views showing steps of a mending method according to the second embodiment of the invention.

Also, in the second embodiment, the inspection on the presence or absence of a break of the signal line 102 is performed using an array tester after the array board 10 has been produced.

Figure 3A:
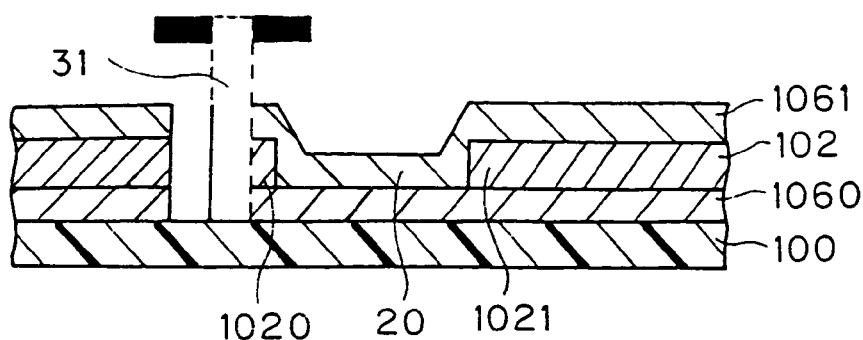
FIGS. 3A-3E are sectional and plane views of assistance in explaining steps of a mending method of a second embodiment of the invention.

When a broken portion 20 is detected in the signal line 102 during the break inspection, the broken end portions 1020, 1021 of the signal line 102, which the broken portion 20 is located between, are irradiated with a laser beam 31 twice for each of the end portions (FIG. 3A).

Figure 3B:
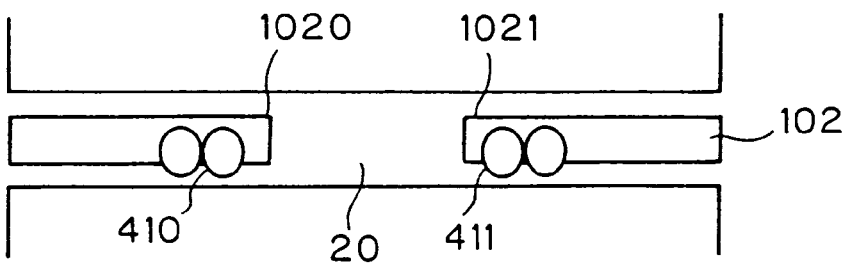

In this step, the laser beam 31 is applied in the condition where the beam deviates by 1-1.5 μm from one end of each signal line-broken end portion 1020, 1021 in the direction of the width of the signal line as in the case of the first embodiment, whereby contact holes 410, 411 are formed in both the signal line-broken end portions 1020, 1021 (FIG. 3B).

The laser beam 31 is applied in the condition where the beam is made to deviate from the width of the signal line and as such, the side faces of the contact holes 410, 411 contact with the signal line 102 along the direction of the thickness thereof.

Figure 3C:
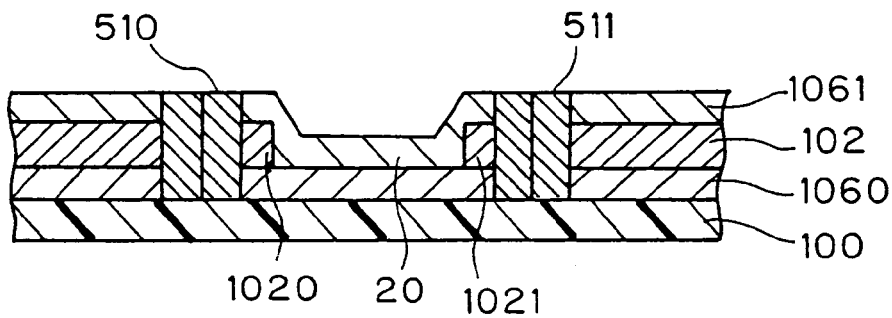

The formed contact holes 410, 411 are filled with tungsten respectively, whereby tungsten-filled contact holes 510, 511 are formed (FIG. 3C).

Figure 3D:
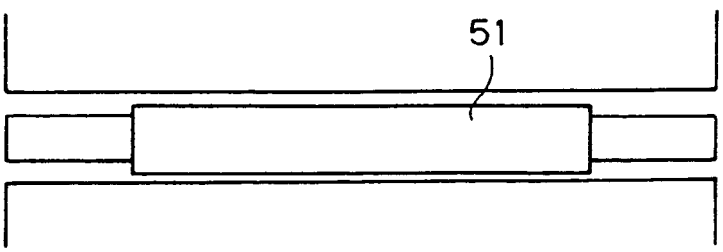
Figure 3E:
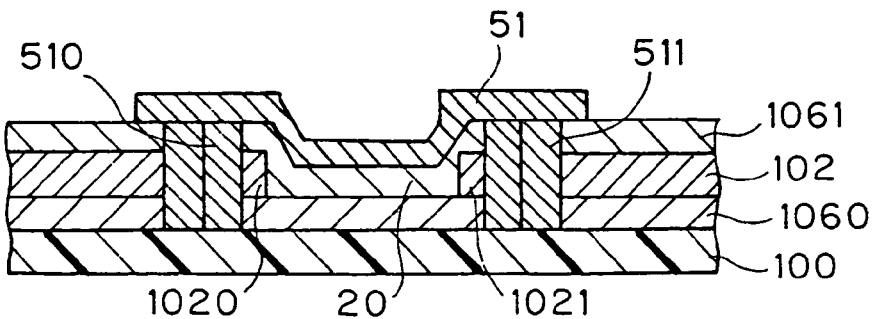

Next, a tungsten line 51 is formed in the shape of a length of line so as to cover all of the tungsten-filled contact holes 510, 511 and the broken portion 20 (FIG. 3D).

As shown in the second embodiment, the two contact holes 410, 411 are formed by boring two holes in each of the signal line-broken end portions 1020, 1021 in the condition where the radial width of each contact hole deviates a bit from the width of the signal line-broken end portion. As a result, the lateral area in association with the direction of diameter of the two holes and the direction of the thickness of the signal line 102 makes a connection area with the signal line 102 substantially. Hence, the resistance is made lower and as such, better repair can be achieved further.

Also, the second embodiment has the following merit: the contact holes never separate the signal line-broken end portions 1020, 1021 in the middle thereof completely and as such, there is not apprehension that insufficient connection between an exposed portion of the signal line formed by each contact hole and a conductive film formed by the laser CVD causes a break.

It is better to form the contact holes 410, 411 spaced away from each other.

Third Embodiment

The embodiments have shown examples in which each contact hole is formed in the shape of a circle. However, the same effect can be obtained even when the contact area with the signal line-broken end portion is made larger by forming contact holes elongated along a direction of the length of the signal line.

FIGS. 4A-4E are illustrations showing steps of a mending method according to the third embodiment of the invention.

Figure 4A:
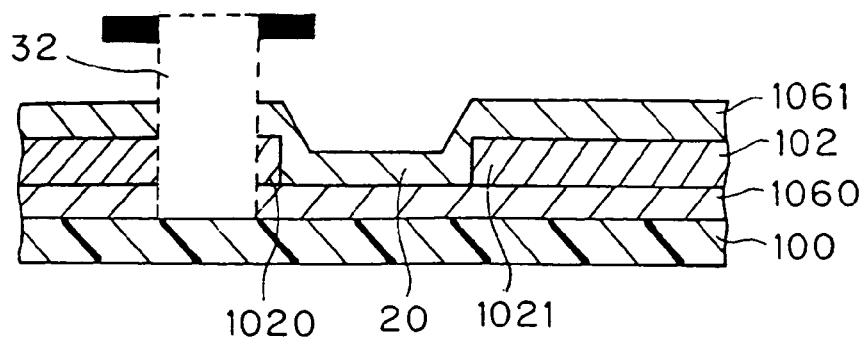
FIGS. 4A-4E are sectional and plane views of assistance in explaining steps of a mending method of a third embodiment of the invention

The array board 10 is subjected to the break inspection of the signal lines 102 using an array tester once after the formation thereof as in the cases of the first and second embodiments. When a broken portion 20 is detected during the break inspection, the broken end portions 1020, 1021 of the signal line 102 in question, which the broken portion 20 is located between, are irradiated with a laser beam 32 of a substantially elliptical shape, in the condition where the beam has in its diameter a long axis in parallel with a direction of the length of the signal line and a short axis direction directed in parallel with the direction of the width of the signal line 102 (FIG. 4A).

Figure 4B:
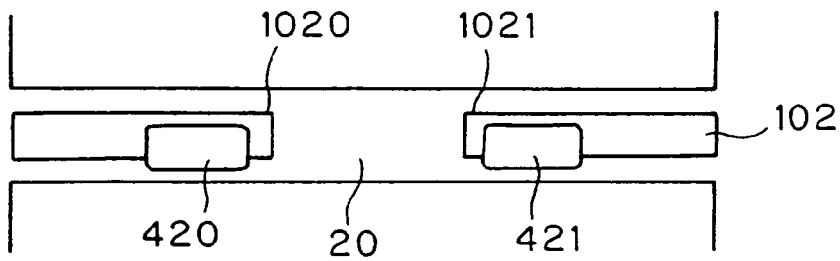

In this step, the laser beam 32 is applied in the condition where the beam deviates by 1.5-2 μm from one end of each signal line-broken end portion 1020, 1021 in the direction of the width of the signal line, whereby contact holes 420, 421 are formed in the signal line-broken end portions 1020, 1021 (FIG. 4B).

The laser beam 32 is applied in the condition where the beam is made to deviate from the width of the signal line and as such, the side faces of the contact holes 420, 421 contact with the signal line 102 along the direction of the thickness thereof.

Figure 4C:
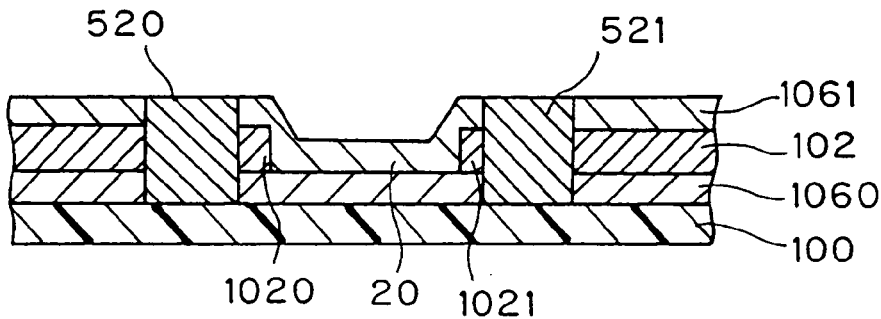

The formed contact holes 420, 421 are filled with tungsten respectively, whereby tungsten-filled contact holes 520, 521 are formed (FIG. 4C).

Figure 4D:
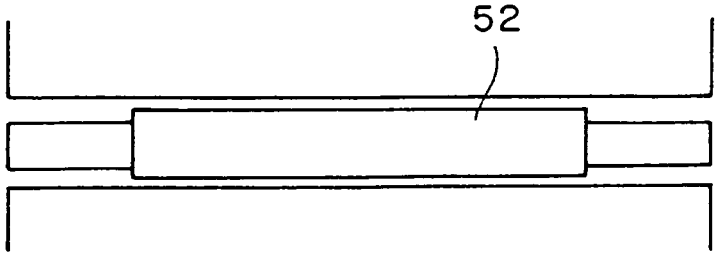
Figure 4E:
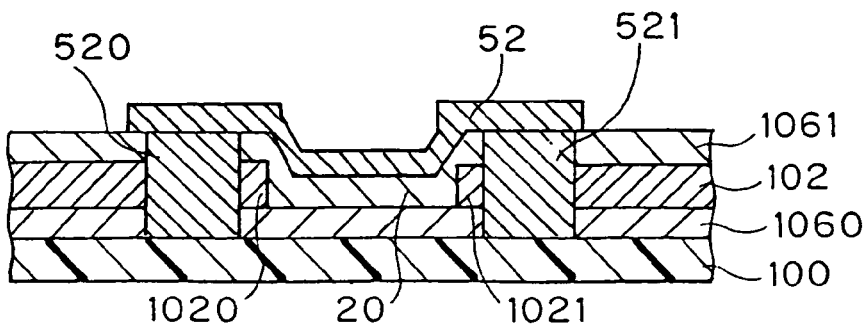

Next, a tungsten line 52 is formed in the shape of a length of line so as to cover all of the tungsten-filled contact holes 520, 521 and the broken portion 20 (FIG. 4D).

As shown in the third embodiment, the contact holes 420, 421 are formed in the signal line-broken end portions 1020, 1021 respectively in the condition where the radial width of each contact hole deviates a bit from the width of the signal line-broken end portion. As a result, the lateral area in association with a direction of the diameter of the holes and the direction of the thickness of the signal line 102 makes a connection area with the signal line 102 substantially. Hence, the resistance is made smaller and as such, better repair can be achieved further.

Also, this embodiment has the following merit: the contact holes never separate the signal line-broken end portions 1020, 1021 in the middle thereof completely and as such, there is not apprehension that insufficient connection between an exposed portion of the signal line formed by each contact hole and a conductive film formed by the laser CVD causes a break.

The invention is not limited to the embodiments, and therefore various changes and modifications may be made without departing from a subject matter thereof.

What is claimed is:

1. A liquid crystal display device, comprising:
   a pair of boards;
   a liquid crystal material held between the pair of boards;
   one of the boards having at least two conductor lines on a primary face thereof;
   at least one of the at least two conductor lines having a broken portion between two end portions of the at least one conductor line, and a recessed portion having a two-dimensional shape of a substantial circle in each of said two end portions;
   the recessed portion opening to one side of the at least one conductor line in a direction of width thereof, thereby exposing a portion of the at least one conductor line along a periphery of the recessed portion;
   an electrical conducting material placed inside the recessed portion and in contact with the exposed portion of the at least one conductor line; and
   a conductive bridge member covering the broken portion and an upper end of the electrical conducting material in each of the recessed portions;
   wherein a center portion of the recessed portion is located on the at least one conductor line and deviates from a center portion of the at least one conductor line in the direction of the width thereof.

2. The liquid crystal display device of claim 1, further comprising a plurality of the recessed portions are provided on the conductor line.

3. The liquid crystal display device of claim 1, wherein the electrical conducting material is tungsten.

4. The liquid crystal display device of claim 1, wherein a size of the two-dimensional shape of the recessed portion is substantially equal to that of the conductor line in the direction of the width.

5. The liquid crystal display device of claim 1, wherein the bridge member is made of tungsten.

* * * * *